June 25, 1963    V. LANGEN ETAL    3,095,224
BALL AND SOCKET JOINTS
Filed March 11, 1960
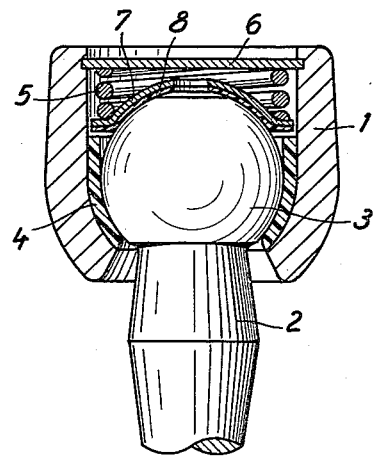
Inventor
Viktor Langen
and Hans Mau
By Diggins + Le Blanc
Attoneys 3,095,224
BALL AND SOCKET JOINTS
Viktor Langen, Meererbusch, near Dusseldorf, and Hans Mau, Leichingen, Rhineland, Germany, assignors to A. Ehrenreich & Cie., Dusseldorf-Oberkassel, Germany, a corporation of Germany
Filed Mar. 11, 1960, Ser. No. 14,270
Claims priority, application Germany Mar. 18, 1959
1 Claim. (Cl. 287—87)

This invention relates to a ball and socket joint which is primarily intended for use in power vehicles, for example in the front wheel suspension and the steering and control gear, in which the ball of the ball and socket joint is mounted in synthetic or artificial material.

In a ball and socket joint it is known to mount the ball of the joint in an artificial material in the housing of the joint. For this purpose, thermoplastic synthetic materials have previously been used, for example synthetic materials, such as polyamides and superpolyamides as well as polycondensation and polyaddition products. Good results were obtained with these materials.

The desirable properties of the thermoplastic synthetic materials are further improved, in accordance with the invention by admixing with the synthetic material, consisting, for example, of a polyamide or superpolyamide, a polymerization product of tetrafluoroethylene. The amount of the polymerization product of tetrafluoroethylene which is added may be from 2-5%.

The polymerization products of tetrafluoroethylene are very insensitive to temperature and can withstand temperatures of —50° and +324° C. without their properties being impaired. Further, these polymerization products have very good antifriction properties. These substances are not themselves suitable, however, for the bearings of a ball and socket joint, because they are too soft and do not withstand large surface pressures.

By means of the invention the good properties of the polymerization product of tetrafluoroethylene are imparted to the thermoplastic synthetic materials which are themselves suitable for use in bearings, with the result that their resistance to temperature is increased and their antifriction properties are improved. Further, the tendency of the polyamides and sugar-polyamides to absorb water is reduced.

The invention includes forming only the bearing surface either of the ball or of a bearing insert in the housing for the ball, or both of these surfaces of a thermoplastic synthetic material containing an addition of a polymerization product of tetrafluoroethylene.

The invention is illustrated, by way of example, in the accompanying drawing which shows a vertical section through a ball and socket joint.

Referring to the drawing, the reference numeral 1 designates the housing of the joint, and the numeral 2 the ball pin which extends out of the housing from the ball 3. The ball is mounted on the side on which the pin 3 extends from the housing in a hollow spherical surface of the housing. The hollow spherical surface is lined with a lining 4. This lining consists of synthetic material consisting of a polyamide containing an addition of a polymerization product of tetrafluoroethylene.

At the side of the joint opposite to that from which the pin 3 extends a plate 7 rests on the ball 3. The plate 7 bears against a layer 8 of synthetic material made from a polyamide containing a polymerization product of tetrafluoroethylene. A helical spring 5 bears against the plate 7 and is supported against a cover 6 which closes the housing and presses the plate with the layer 6 against the ball.

We claim:

A ball and socket joint for use in the front wheel suspension and the steering and control gear of power vehicles comprising a joint housing, a ball in said housing, a pin on said ball extending from said housing, and bearing means between said ball and said housing for supporting said ball in said housing, said bearing means comprising a lining of synthetic polyamide containing from 2-5% polytetrafluoroethylene.

References Cited in the file of this patent

UNITED STATES PATENTS

| | | |
|---|---|---|
| 2,695,425 | Stott | Nov. 30, 1954 |
| 2,835,540 | Jorgensen | May 20, 1958 |
| 2,846,251 | Herbenar | Aug. 5, 1958 |
| 2,912,267 | Latzen | Nov. 10, 1959 |